(12) United States Patent
Wakiya et al.

(10) Patent No.: US 6,693,142 B1
(45) Date of Patent: Feb. 17, 2004

(54) PROCESS FOR PRODUCING VINYL POLYMER HAVING FUNCTIONAL GROUP AT END AND VINYL POLYMER HAVING FUNCTIONAL GROUP AT END

(75) Inventors: Takeshi Wakiya, Takatsuki (JP); Takamaro Kakehi, Nagaokakyo (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/019,055

(22) PCT Filed: Apr. 12, 2000

(86) PCT No.: PCT/JP00/02386

§ 371 (c)(1), (2), (4) Date: Jun. 24, 2002

(87) PCT Pub. No.: WO00/61641

PCT Pub. Date: Oct. 19, 2000

(30) Foreign Application Priority Data

Apr. 12, 1999 (JP) .............................. 11-104378
May 20, 1999 (JP) .............................. 11-140041
Jun. 25, 1999 (JP) .............................. 11-180164

(51) Int. Cl.[7] .............................. C08F 2/50; C08F 2/46
(52) U.S. Cl. .............................. 522/155; 522/6; 522/66; 522/67; 522/113; 522/114; 522/116; 522/118; 522/120; 522/124; 522/125; 522/132; 522/150; 522/157; 522/158; 522/159; 522/161
(58) Field of Search .............................. 525/330.3, 55, 525/153, 154, 190, 329.7, 330.2, 339, 451; 528/12, 14, 25, 220, 246, 271; 522/6, 66, 67, 74, 81, 113, 114, 116, 118, 120, 124, 125, 132, 150, 155, 157, 158, 159, 161; 526/135, 145, 146, 147

(56) References Cited

U.S. PATENT DOCUMENTS 5,345,018 A * 9/1994 Bak et al. .................. 570/249
5,807,937 A * 9/1998 Matyjaszewski et al. ... 526/135
5,852,129 A * 12/1998 Kusakabe et al. ....... 525/330.3
6,194,516 B1 * 2/2001 Kusakabe et al. .......... 525/123

* cited by examiner

Primary Examiner—James J. Seidieck
Assistant Examiner—Sanza McClendon
(74) Attorney, Agent, or Firm—Connolly Bove Lodge & Hutz LLP

(57) ABSTRACT

The objective of the present invention is to provide a production method by which a polymer of a functional group-terminated vinyl monomer can be easily and practically produced.

Further, it is another object of the present invention to provide a functional group-terminated vinyl polymer which is useful as a material for the production of various functional products.

The first aspect of the present invention is concerned with a production method of a functional group-terminated vinyl polymer comprising a step of synthesizing a halogen atom-terminated vinyl polymer by the radical polymerization reaction of a vinyl monomer in the presence of a halogen compound and a step of introducing a functional group to a terminus by substituting a functional group-containing group for the terminal halogen atom of said vinyl polymer.

11 Claims, No Drawings

PROCESS FOR PRODUCING VINYL POLYMER HAVING FUNCTIONAL GROUP AT END AND VINYL POLYMER HAVING FUNCTIONAL GROUP AT END

TECHNICAL FIELD

The present invention relates to a production method of functional group-terminated vinyl polymers and functional group-terminated vinyl polymers as obtainable by the above method.

BACKGROUND ART

It is known that functional group-terminated polymers may undergo crosslinking, either by themselves or in the presence of another polymer having a terminal or chain-interrupting functional group and an appropriate curing agent depending on the properties of functional groups, to give functional products having outstanding heat resistance, water resistance, durability, compatibility and other characteristics. Moreover, when a polymer has functional groups at all its molecular termini, a chain extension by terminus-terminus crosslinking occurs with good efficiency to give a linear or network high molecular weight polymer and, hence, a resin with excellent elongation and tensile strength characteristics.

Functional group-terminated polymers are of great use as, for example, reactive raw materials for resins such as polyester resin, polyurethane resin, polycarbonate resin, etc., paints, adhesives, self-adhesives, sealants, urethane foams, gel coatings, thermoplastic elastomers, molding compounds, resin modifiers, dampers, elastic wall and floor panels, textile processing agents, UV.EV-curable resin, high-solid paints and so forth. These are also useful as various resin additives and raw materials.

Referring to rubber type polymers among functional group-terminated polymers, many reports are available on their syntheses until now. Moreover, polymers having a functional group at both termini of a polyether backbone chain have heretofore been used as starting materials for urethane adhesives and sealants or modifiers for epoxy adhesives. In addition, polyester resins such as polyethylene terephthalate and polycaprolactone have also been used in many applications. However, as to other resins, particularly those of vinyl monomers having polar groups, the production method for functional group-terminated vinyl polymers has not been implemented on a commercial scale as yet.

As for a production method of polymers of such functional group-terminated highly polar vinyl monomers, for example, Japanese Kokai Publication Hei-5-255415 discloses a process for synthesizing a (meth)acrylic polymer having an alkenyl group at either terminus by using an alkenyl group-containing disulfide as a chain transfer agent. Japanese Kokai Publication Hei-5-262808 discloses a process comprising synthesizing an acrylic polymer having a hydroxyl group at either terminus by using a hydroxyl group-containing disulfide and utilizing these terminal hydroxyl groups, synthesizing an alkenyl group-terminated (meth)acrylic polymer. However, in the former process, a functional group can hardly be introduced into the terminus with certainty and the latter process requires a chain transfer agent in a large amount for synthesizing a hydroxyl group-containing polymer. Thus, these synthetic technologies have drawbacks in some process parameters or others.

Recently much research has been undertaken on the polymerization by the living polymerization method inclusive of living ionic polymerization and living radical polymerization. In the synthesis of polymers by these polymerization techniques, the molecular weight and molecular weight distribution can be controlled and, moreover, by converting the active group at the living terminus to a desired substituent group, a functional group-terminated polymer can be obtainable with comparative ease.

Referring to the production method of a functional group-terminated polymer by utilizing the above-mentioned living ionic polymerization method, Japanese Kohyo Publication Hei-4-501883, for instance, discloses a process for synthesizing a hydroxyl group-terminated poly(meth)acrylic ester and a process for synthesizing a (meth)acrylic acid macromonomer by way of living anionic polymerization. However, in the case of such anionic polymerization, the termination reaction and chain transfer reaction cannot be controlled unless anhydrous or low-temperature conditions are maintained and the reaction does not proceed in the living fashion so that the terminal transformation is rendered impossible. Therefore, the technology is lacking in commercial utility.

Referring to living radical polymerization, Japanese Kokai Publication Hei-9-272714, for instance, discloses a production method of an alkenyl group-terminated (meth)acrylic polymer which comprises using an organohalogen or brominated sulfonyl compound as an initiator and an equivalent amount thereto of a complex of a Group 8 to 11 transition metal as a catalyst. However, the transition metal complex has such a high affinity for oxygen that unless in a completely inert system its catalytic activity is lost to arrest the progress of polymerization. Therefore, the technology is not practically useful as for a production.

SUMMARY OF THE INVENTION

The present invention, developed in light of the above state of the art, has for its object to provide a production method by which a polymer of a functional group-terminated vinyl monomer can be easily and practically produced.

It is another object of the present invention to provide a functional group-terminated vinyl polymer which is useful as a material for the production of various functional products.

The first aspect of the present invention is concerned with a production method of a functional group-terminated vinyl polymer comprising a step of synthesizing a halogen atom-terminated vinyl polymer by the radical polymerization reaction of a vinyl monomer in the presence of a halogen compound and a step of introducing a functional group to a terminus by substituting a functional group-containing-group for the terminal halogen atom of said vinyl polymer, said halogen compound having a structure such that said halogen atom is bound to a carbon atom linked to an aromatic ring and said radical polymerization reaction being carried out either by light irradiation or light irradiation in the presence of a Group 14 to 16 metal compound or by heating in the presence of a Group 14 to 16 metal compound.

The second aspect of the present invention is concerned with a production method of a functional group-terminated vinyl polymer comprising a step of synthesizing an iodine atom-terminated vinyl polymer by the radical polymerization reaction of a vinyl monomer in the presence of an iodine compound and a step of introducing a functional group to the terminus by substituting a functional group-containing group for the terminal iodine atom of said vinyl polymer, said iodine compound having a structure such that said iodine atom is bound to a carbon atom linked to an aromatic ring and said radical polymerization reaction being carried out either by heating or by heating in the presence of a radical polymerization initiator.

The third aspect of the present invention is concerned with a functional group-terminated vinyl polymer as obtainable by the production method according to the first aspect or the second aspect of the invention which has a number average molecular weight of 500 to 50,000 and a terminal functional group introduction rate of not less than 90%.

DISCLOSURE OF THE INVENTION

In the following, the present invention is now described in detail.

In the production method according to the first aspect of the invention, a vinyl monomer is subjected to radical polymerization reaction in the presence of a halogen compound in the first place to synthesize a halogen atom-terminated vinyl polymer.

The vinyl monomer to be used in this first aspect of the invention is not particularly restricted but includes, for example, (meth)acrylic acid, (meth)acrylic esters, styrene derivatives, (meth)acrylonitrile, (meth)acrylamide, vinyl halides, vinyl esters, (meth)acrolein, maleic acid derivatives, fumaric acid derivatives, and so forth. The preferred, among these vinyl monomers, are (meth)acrylic esters, styrene derivatives, (meth)acrylonitrile and vinyl esters. Particularly preferred are (meth)acrylic esters, styrene derivatives and (meth)acrylonitrile. These vinyl monomers can be used each independently or in a combination of two or more species.

The (meth)acrylic esters mentioned above are not particularly restricted but include, for example, methyl (meth) acrylate, ethyl (meth)acrylate, n-propyl (meth)acrylate, iso-propyl (meth)acrylate, n-butyl (meth)acrylate, isobutyl (meth)acrylate, tert-butyl (meth)acrylate, pentyl (meth) acrylate, n-hexyl (meth)acrylate, isohexyl (meth)acrylate, n-octyl (meth)acrylate, isooctyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, stearyl (meth)acrylate, 2-hydroxyethyl (meth)acrylate, 3-methoxypropyl (meth)acrylate, and so forth. These (meth) acrylic esters may have substituent groups on alkyl chains where necessary. Incidentally, the term (meth)acrylic acid means methacrylic acid or acrylic acid.

The styrene derivatives mentioned above are not particularly restricted but include, for example, α-methylstyrene, p-mehtoxystyrene, p-phenoxystyrene, p-t-butoxystyrene, m-methoxystyrene, o-methoxystyrene, p-methylstyrene, p-phenylstyrene, p-chloromethylstyrene, p-t-butylstyrene, m-methylstyrene, p-trimethylsiloxystyrene, o-chlorostyrene, and so forth.

The vinyl esters mentioned above are not particularly restricted but include, for example, vinyl acetate, vinyl formate, vinyl propionate, vinyl butyrate, vinyl n-caproate, vinyl isocaproate, vinyl octanoate, vinyl laurate, vinyl palmitate, vinyl stearate, vinyl trimethyl acetate, vinyl chloroacetate, vinyl trichloroacetate, vinyl trifluoroacetate, vinyl benzoate, and so forth.

These vinyl monomers can be used each independently or in a combination of two or more species.

The form of copolymer as obtainable by using two or more species of said vinyl monomer is not particularly restricted but includes a random copolymer and a block copolymer, for instance. The production method thereof is not particularly restricted, either. Thus, when a block copolymer, for instance, is to be produced, monomers are added into the reaction system serially one after consumption of another.

The halogen compound for use in the production method according to the first aspect of the invention has a structure such that a halogen atom is bound to a carbon atom linked to an aromatic ring.

Since, in a halogen compound having the above structure, the halogen atom is bound to a carbon atom linked to an aromatic ring which is an electron-donating group, the carbon-halogen bond is apt to undergo radical dissociation. Moreover, after the radical dissociation has occurred, the radical-stabilizing effect of the aromatic ring $\pi$ electrons leads to a higher selective chain transfer activity of the generated carbon radical to the vinyl monomer and facilitates reaction control. Therefore, by using a halogen compound having the above structure, a halogen atom-terminated vinyl polymer can be easily obtained.

The halogen compound mentioned above has a structure such that a halogen atom is further bound to a carbon atom directly linked to an aromatic ring. The above halogen atom is preferably an iodine atom, a chlorine atom or a bromine atom.

The aromatic ring mentioned above is not particularly restricted but includes, for example, a benzene ring, a naphthalene ring, an anthracene ring, and so forth.

The above aromatic ring may have one or more substituent groups where necessary. The above substituent group is not particularly restricted unless the radical polymerization reaction is there by interfered with, thus including, for example, alkyl, alkoxy, amino, hydroxyl, halogen, carbonyl, carboxyl, mercapto and the like groups. These substituent groups may have been introduced one species only or two or more species.

To the carbon atom linked to said halogen atom and aromatic ring, one or two substituent groups may be linked where necessary. The substituent groups mentioned above are not particularly restricted insofar as the radical polymerization reaction will not be interfered with, thus including, for example, alkyl, alkoxy, amino, hydroxyl, carbonyl, carboxyl, mercapto, and the like groups. These substituent groups may be the one or two or more species.

Specifically, such halogen compound includes, for example, iodine compounds such as iodomethylbenzene, iodomethylnaphthalene, 1,3-bis(iodomethyl)benzene, 1,4-bis(iodomethyl)benzene, 1,3,5-tris(iodomethyl)benzene, diphenyldiiodomethane, 4,4'-bis(iodomethyl)biphenyl, bis(4-iodomethylphenyl)methane, 4,4'-bis(iodomethyl) diphenyl ether, 1,5-bis(iodomethyl)naphthalene, 2,6-bis (iodomethyl) naphthalene, 2,4,6,8-tetrakis(iodomethyl) naphthalene, 2,6-bis(iodomethyl)anthracene, 9,10-bis (iodomethyl)anthracene, 1,4,5,8-tetrakis(iodomethyl) anthracene, etc.; chlorine compounds such as chloromethylbenzene, chloromethylnaphthalene, 1,3-bis (chloromethyl)benzene, 1,4-bis(chloromethyl)benzene, 1,3, 5-tris(chloromethyl)benzene, diphenyldichloromethane, 4,4'-bis(chloromethyl)biphenyl, bis(4-chloromethyl-phenyl) methane, 4,4'-bis(chloromethyl)diphenyl ether, 1,5-bis (chloromethyl)naphthalene, 2,6-bis(chloromethyl)

naphthalene, 2,4,6,8-tetrakis(chloromethyl)naphthalene, 2,6-bis(chloromethyl)anthracene, 9,10-bis(chloromethyl) anthracene, 1,4,5,8-tetrakis(chloromethyl)anthracene, etc.; and bromine compounds such as bromomethylbenzene, bromomethylnaphthalene, 1,3-bis(bromomethyl)benzene, 1,4-bis(bromomethyl-)benzene, 1,3,5-tris(bromomethyl) benzene, diphenyldibromomethane, 4,4'-bis(bromomethyl) biphenyl, bis(4-bromomethylphenyl)methane, 4,4'-bis (bromomethyl)diphenylether, 1,5-bis(bromomethyl) naphthalene, 2,6-bis(bromomethyl)naphthalene, 2,4,6,8-tetrakis(bromomethyl)naphthalene, 2,6-bis(bromomethyl) anthracene, 9,10-bis(bromomethyl)anthracene, 1,4,5,8-tetrakis(bromomethyl)anthracene, and so forth. Among these, iodine compounds are preferred in view of their higher reactivity and chlorine compounds are preferred from availability points of view. These halogen compounds can be used each independently or in a combination of two or more species.

Among these halogen compounds, for the purpose of obtaining a linear polymer having a functional group only at one terminus, a halogen compound having one halogen atom within the molecule is preferred. For the purpose of obtaining a linear polymer having a functional group at both termini, a halogen compound having two halogen atoms within the molecule is preferred. Further, for the purpose of obtaining a stellate polymer, a halogen compound having three or more halogen atoms within the molecule is preferred.

The halogen compound for use in the production method according to the first aspect of the invention is preferably a halogen compound having two or more halogen atoms within the molecule, more preferably a halogen compound having two halogen atoms within the molecule. By using said halogen compound having two halogen atoms within the molecule, a polymer having a halogen atom at both termini of the molecule can be polymerized, and by substituting a functional group for it, a linear polymer having the functional group at both termini is obtainable. Then, by using it as the main raw material, a molecular mass increase by chain extension can be efficiently carried out.

In case said halogen compound has two or more halogen atoms within the molecule, the halogen atoms within the molecule may all be of the same species or of different species. However, since the reactivity varies according to different halogen atom species, they are preferably of the same species from the standpoint of the ease of reaction control.

For synthesizing said halogen atom-terminated vinyl polymer in the production method according to the first aspect of the invention, the vinyl monomer described above is subjected to radical polymerization in the presence of said halogen compound.

In the production method according to the first aspect of the invention, said radical polymerization is effected either by light irradiation, by light irradiation in the presence of a Group 14 to 16 metal compound, or by heating in the presence of a Group 14 to 16 metal compound.

Among these, the method involving light irradiation is preferred. By light irradiation, the carbon-halogen bond is selectively encouraged to undergo radical dissociation so that chances for side reactions during polymerization are diminished.

The light source which can be used for the above light irradiation in the production method according to the first aspect of the invention is not particularly restricted insofar as bonds other than the carbon-halogen bond, e.g. the carbon-carbon bond or carbon-hydrogen bond of the backbone chain, are not cleaved, and can be selected in consideration of the range of carbon-halogen activation. The above light source, for example, includes a high-pressure mercury vapor lamp, a low-pressure mercury vapor lamp, an ultra-high-pressure mercury vapor lamp, a xenon-mercury lamp, an excimer laser, a xenon lamp, and so forth.

The irradiation intensity of said light source is selected within the range not adversely affecting the polymer synthesis and is preferably 0.01 to 10J/cm$^2$. If the irradiation intensity is less than 0.01 J/cm$^2$, it will not effectively act on the carbon-halogen bond so that the polymerization reaction tends to be retarded. If the irradiation intensity exceeds 10 J/cm$^2$, the reaction may hardly be controlled since the irradiation intensity is too high.

In the above method involving light irradiation, a photosensitizer, such as an azo compound, aperoxide, a carbonyl compound, a sulfur compound ox a dye, a metal compound and/or a radical polymerization initiator may be added where necessary. These may be used each independently or in a combination of two or more species.

In the first aspect of the invention, when the radical polymerization reaction by light irradiation is carried out as mentioned above, the light irradiation is preferably carried out in the presence of a Group 14 to 16 metal compound. By using the above Group 14 to 16 metal compound, the radical dissociation of the carbon-halogen is even more facilitated to increase the polymerization rate so that the polymerization period is curtailed and the degree of polymerization is increased. Moreover, since a Group 14 to 16 metal compound acts as a catalyst, as mentioned hereinafter, for the chemical transformation of a halogen atom of a polymerization terminus to a functional group, too, it is unnecessary to add a catalyst in the step of chemical transformation of a functional group.

The preferred Group 14 to 16 metal compound is a compound of tin, lead, antimony, bismuth, tellurium and polonium. When said halogen compound is an iodine compound, a compound of tin or bismuth is preferred and when the halogen compound is a chlorine compound, a compound of bismuth is preferred.

The Group 14 to 16 metal compound is not particularly restricted but may be whichever of an inorganic metal compound or an organic metal compound. Thus, for example, there can be mentioned tin compounds such as tin, fluoride, tin chloride, tin bromide, tin iodide, tin oxide, tin bis (2-ethylhexanoate), tin bis(neodecanoate), tin n-butyltris (2-ethylhexanoate), tin acetate, di-n-butylbis(dodecylthio) tin, tin di-n-butylbis(2-ethylhexanoate), di-n-butyldiacetoxytin, di-t-butyldiacetoxytin, di-n-butylmethoxytin, tin, di-n-butyl-S,S'-bis (isooctylmercaptoacetate), tin dimethyldineodecanoate, tin dioctyldilaurate, tin dioctyldineodecanoate, tetra-t-butoxytin, tetra-n-butyltin, tetraethyltin, tetraisopropyltin, tetra-n-octyltin, tetra-n-pentyltin, tetraphenyltin, tetra-p-tolyltin, tri-n-butylethoxytin, tri-n-butylmethoxytin, tri-n-butylmethyltin, tri-n-butyltin, etc.; lead compounds such as lead fluoride, lead chloride, lead bromide, lead iodide, lead tetracetate, lead bis(2-ethylhexanoate), lead bis(2,4-pentanedionate), tetraphenyllead, etc.; tellurium compounds such as tellurium ethoxide etc.; and bismuth compounds such as bismuth chloride, bismuth tris (tetramethylheptanedionate), bismuth tris(t-pentoxide), bismuth tris(2-ethylhexanoate), and so forth. These Group 14 to 16 metal compounds may be used each independently or in a combination of two or more species.

The level of addition of said Group 14 to 16 metal compound depends on the kind of metal compound but is preferably 0.001 to 10 moles per mole of the halogen compound. If the level of the addition of the Group 14 to 16 metal compound is below 0.001 mole per mole of the halogen compound, a sufficient catalytic effect may not be obtained. If it exceeds 10 moles, the metal compound may not be easily removed in the purification step. The more preferred level is 0.05 to 1 mole per mole of the halogen compound.

In the production method according to the first aspect of the invention, the radical polymerization reaction is carried out by heating in the presence of a Group 14 to 16 metal compound. In the case the halogen compound is not an iodine compound, the radical polymerization reaction may not proceed well on mere heating. However, heating and using said Group 14 to 16 metal compound leads to an increased polymerization rate. In this case, a radical polymerization initiator may be used concomitantly.

When the polymerization is carried out by heating and using said Group 14 to 16 metal compound, the level of addition of the Group 14 to 16 metal compound is preferably the same level as the level used for the above-described method involving light irradiation.

In the production method according to the first aspect of the invention, the specific method for synthesizing a halogen atom-terminated vinyl polymer by the above radical polymerization is not particularly restricted but the hitherto-known polymerization methods can be utilized. For example, the block polymerization method or the solution polymerization method can be employed.

When, among these polymerization techniques, the solution polymerization is used, it is preferred to use a solvent which does not interfere with radical polymerization as a polymerization solvent. As such polymerization solvents, there can be mentioned, for example, ester solvents such as ethyl acetate, propyl acetate, butyl acetate, etc.; ketone solvents such as methyl ethyl ketone, cyclohexarone, etc.; aromatic solvents such as benzene, toluene, xylene, etc.; Cellosolve solvents such as methyl-Cellosolve, ethyl-Cellosolve, etc.; dimethylformamide; dimethyl sulfoxide; and so forth. These polymerization solvents may be used each independently or in a combination of two or more species.

The reaction temperature for use in synthesizing the above halogen atom-terminated vinyl polymer is not particularly restricted but the ordinary reaction temperature can be properly selected in accordance with the kind of vinyl monomer used.

In the production method according to the first aspect of the invention, the synthesis of a halogen atom-containing vinyl polymer is followed by substitution of a functional group-containing group for the terminal halogen atom of said vinyl polymer to thereby introduce the functional group into the terminus.

The functional group to be introduced into the terminus of said vinyl polymer is not particularly restricted unless it is lost with time, thus including, for example, hydroxyl, amino, carboxyl, epoxy, vinyl, silyl, ethynyl, mercapto, oxazoline, maleimido, azlactone, and the like groups. Among these, the preferred functional group to be introduced into the terminus is at least one kind of functional group selected from the group consisting of hydroxyl, amino, carboxyl, vinyl and silyl groups. The silyl group mentioned above includes hydrosilyl, hydroxysilyl and alkoxysilyl groups.

The method of introducing a functional group into the terminus of said vinyl polymer is not particularly restricted but the hitherto-known chemical reactions can be utilized unless the methods cause resin degradation.

The compound (terminal modifier) to be used in the introduction of a functional group into a terminus of the above vinyl polymer is not particularly restricted, either, but includes the hitherto-known compounds.

The method of introducing a functional group into the terminus of the above vinyl polymer includes, for example, the introduction of a hydroxyl group by the direct substitution of the terminal halogen with sodium hydroxide or the like; the introduction of a hydroxyl, amino, carboxyl, vinyl or alkoxysilyl group using aminoethanol, ethylenediamine, glycine, p-aminostyrene, or 3-aminopropyltriethoxysilane, for instance, in a halogen-amino substitution reaction; the introduction of a hydroxyl, carboxyl or alkoxysilyl group using mercaptoethanol, mercaptopropionic acid or 3-mercaptopropyltrimethoxysilane, for instance, in a halogen-mercapto substitution reaction; the introduction of a carboxyl group through the substitution reaction of the terminal halogen with chlorosulfonic acid and subsequent hydrolysis; the introduction of a vinyl group by a ligand interchange reaction using a vinyl group-containing various organometal compound; and the introduction of a hydrosilyl group through the addition of 1,3,5,7,9-pentamethylcyclopentasiloxane to the vinyl group terminus.

The second aspect of the present invention is concerned with a production method of a functional group-terminated vinyl polymer comprising a step of synthesizing an iodine atom-terminated vinyl polymer by the radical polymerization reaction of a vinyl monomer in the presence of an iodine compound and a step of introducing a functional group to the terminus by substituting a functional group-containing group for the terminal iodine atom of said vinyl polymer, said iodine compound having a structure such that said iodine atom is bound to a carbon atom linked to an aromatic ring and said radical polymerization reaction being carried out either by heating or by heating in the presence of a radical polymerization initiator.

The iodine compound for use in the production method according to the second aspect of the invention includes the same ones as the iodine compound for use in accordance with the first aspect of the invention.

Particularly, the iodine compound for use in this production method according to the second aspect of the invention is preferably an iodine compound having two or more iodine atoms within the molecule, more preferably an iodine compound having two iodine atoms within the molecule. By using said iodine compound having two iodine atoms within the molecule, a polymer having an iodine atom at both termini can be polymerized, and by substituting a functional group for it, a linear polymer having the functional group at both termini is obtainable. Then, by using it as a main raw material, a molecular mass increase by chain extension can be efficiently carried out.

In the production method according to the second aspect of the invention where an iodine compound such as described above is used in the step of polymerizing a vinyl polymer, the radical polymerization reaction can be carried out by mere heating.

In the second aspect of the invention, when the radical polymerization reaction is carried out by heating, it is preferred to use a radical polymerization initiator, further. The use of a radical polymerization initiator leads to increase the polymerization rate so that the polymerization period is curtailed and the degree of polymerization is increased.

As said radical polymerization initiator, a compound which generates a radical with heat, light, radiation or a redox chemical reaction can be employed.

Such radical polymerization initiator is not particularly restricted but includes, for example, organic peroxides such as dialkyl peroxides, diacyl peroxides and peroxy esters, e.g. peroxycarbonates, ketone peroxides, peroxyketals, hydroperoxides, lauroyl peroxide, benzoyl peroxide, etc.; azo compounds such as 2,2'-azobisisobutyronitrile, 2,2'-azobis(2-methylbutyronitrile), 2,2'-azobis(2,4-dimethylvaleronitrile), dimethyl 2,2'-azobisisobutyrate, etc.; inorganic peroxides such as potassium persulfate, ammonium persulfate, etc.; and redox initiators such as the hydrogen peroxide-iron (II) system, benzoyl peroxide-dimethylaniline system, cerium (IV) salt-alcohol system, and so forth.

These radical polymerization initiators can be properly selected in accordance with the polymerization conditions such as the polymerization temperature and the like. Moreover, these may be used each independently or in a combination of two or more species.

The level of said radical polymerization initiator is not particularly restricted insofar as it is sufficient to initiate the polymerization but is preferably 0.02 to 20 moles per mole of said iodine compound. If it is less than 0.02 moles, the polymerization rate will be low and the degree of polymerization may also be decreased. If it exceeds 20 moles, it may become difficult to control the polymerization reaction. More preferably, it is 0.05 to 10 moles per mole of said iodine compound.

In the production method according to the second aspect of the invention, the other constitutions are identical with those in the first aspect of the invention.

By using the production method of a functional group-terminated vinyl polymer in accordance with the first or the second aspect of the invention, a functional group-terminated vinyl polymer can be produced with ease and commercial advantage.

A third aspect of the present invention is concerned with a functional group-terminated vinyl polymer as obtainable by the production method according to the first or the second aspect of the invention.

The functional group-terminated vinyl polymer according to the third aspect of the invention has a number average molecular weight of 500 to 50,000 and a terminal functional group introduction rate of not less than 90%. If the above number average molecular weight is less than 500, a large amount of a crosslinking agent is required to use it as a raw material for functional products and it is not practical. If the above number average molecular weight exceeds 50,000, when using it as a raw material for functional products, the crosslinking reactivity will be decreased so that the desired characteristics may not be imparted to the functional products to be produced.

Further, if the above terminal functional group introduction rate is less than 90%, in the application of the functional group-terminated vinyl polymer as a raw material for functional products, no sufficient crosslinking reaction will take place so that, the desired characteristics may not be imparted to the functional products to be produced.

The above terminal functional group introduction rate means the percentage of the number of functional groups actually introduced into the termini of the vinyl polymer obtainable by the production method according to the first or the second aspect of the invention relative to the theoretical number of functional groups introduced into the termini of the vinyl polymer. The number of functional groups actually introduced into the termini of said vinyl polymer can be calculated by using the hitherto-known determination method.

Such functional group-terminated vinyl polymer can be used with advantage as a raw material for functional products such as adhesives, self-adhesives, sealants, foamed products, coatings, powder coatings, thermoplastic elastomers, film compounds, molding compounds, resin modifiers, coating agents, dampers, semiconductor sealants, water-stop agents, artificial marble and so forth.

BEST MODE FOR CARRYING OUT THE INVENTION

In the following, the present invention is described in further detail with the examples, but the following examples are by no means limitative of the scope of the present invention.

EXAMPLES 1 TO 3 AND COMPARATIVE EXAMPLES 1 TO 3

The monomer and halogen compound indicated in Table 1 or 2 were weighed into a 500 mL autoclave, followed by bubbling for nitrogen purging. Then, under stirring at 100 rpm in a nitrogen gas stream, internal autoclave was kept at 150° C. The polymerization was stopped 16 hours after the start of reaction and 5 mL portion of the reaction mixture was sampled, weighed accurately, and concentrated to dryness at 120° C. The residue was accurately weighed after drying, and the degree of polymerization was calculated. After completion of polymerization, the terminal modifier and solvent B shown in Table 1 or 2 were added in the indicated amounts and the reaction was carried out at 120° C. for 24 hours. Thereafter, the unreacted monomer, unreacted terminal modifier and solvent were removed by purification and the polymerization product, designated as A-1 to 3 and F-1 to 3, respectively, was taken out.

EXAMPLES 4, 5 AND 7 AND COMPARATIVE EXAMPLES 4 TO 6

The monomer, radical polymerization initiator, solvent A and halogen compound indicated in Table 1 or 2 were weighed into a 500 mL-volume separable flask and a four-neck separable cover, a stirring impeller, a three-way cock, a cooling tube and a temperature probe were attached to the flask, followed by bubbling for nitrogen purging. Then, under stirring at 100 rpm in a nitrogen gas stream, the polymerization was carried out at an internal temperature of 80° C. The polymerization was stopped 6 hours after the start of reaction and 5 mL portion of the reaction mixture was sampled, weighed accurately, and concentrated to dryness at 120° C. After drying, the residue was weighed accurately and the degree of polymerization was calculated. After completion of polymerization, the terminal modifier shown in Table 1 or 2 was added in the indicated amount and reacted at 120° C. for 24 hours. Thereafter, the unreacted monomer, unreacted terminal modifier and solvent were removed by purification and the polymerization product, designated as B-1, 2, 4 and G-1 to 3, respectively, was taken out.

EXAMPLE 6

2-Ethylhexyl acrylate and the radical polymerization initiator, solvent A and halogen compound indicated in Table 1 were weighed into a 500 mL-volume separable flask, which was then fitted with a four-neck separable cover, stirring impeller, three-way cock, cooling tube and temperature probe, followed by bubbling for nitrogen purging. Then, under stirring at 100 rpm in a nitrogen gas stream, the polymerization was carried out at an internal temperature of 80° C. At 6 hours after the start of reaction, methyl methacrylate bubbled through with $N_2$ gas for nitrogen purging in advance was added as indicated in Table 1. After 2 hours, the polymerization was stopped and 5 mL of the reaction mixture was sampled, weighed accurately, and concentrated to dryness at 120° C. After drying, the residue was weighed accurately and the degree of polymerization was calculated. After completion of polymerization, the terminal modifier shown in Table 1 was added in the indicated amount and reacted at120° C. for 24 hours. Thereafter, the unreacted monomer, unreacted terminal modifier and solvent were removed by purification and the polymerization product B-3 was taken out.

EXAMPLES 8 TO 10 AND 12 AND COMPARATIVE EXAMPLES 7 to 10

The monomer, halogen compound and metal compound indicated in Table 1 or 2 were weighed into a 500 mL-volume autoclave followed by bubbling for nitrogen purging. Then, under stirring at 100 rpm in a nitrogen gas stream, the polymerization was carried out at an internal temperature of 150° C. The polymerization was stopped 8 hours after the start of reaction and 5 mL of the reaction mixture was sampled, weighed accurately, and concentrated to dryness at 120° C. After drying, the residue was weighed accurately and the degree of polymerization was calculated. After completion of polymerization, the terminal modifier and solvent B shown in Table 1 or 2 were added in the indicated amounts and the reaction was carried out at 120° C. for 24 hours. Thereafter, the unreacted monomer, unreacted terminal modifier and solvent were removed by purification and the polymerization product, designated as C-1 to 3, C-5 and H-1 to 4, respectively, was taken out.

EXAMPLE 11

2-Ethylhexyl acrylate, halogen compound and metal compound indicated in Table 1 were weighed into a 500 mL-volume autoclave, followed by bubbling for nitrogen purging. Then, under stirring at 100 rpm in a nitrogen gas stream, the polymerization was carried out at an internal temperature of 150° C. At 8 hours after the start of reaction, methyl methacrylate bubbled through with $N_2$ gas for nitrogen purging in advance was added as indicated in Table 1. After 4 hours, the polymerization was stopped and 5 mL of the reaction mixture was sampled, weighed accurately, and concentrated to dryness at 120° C. After drying, the residue was weighed accurately and the degree of polymerization was calculated. After completion of polymerization, the terminal modifier shown in Table 1 was added in the indicated amount and reacted at 120° C for 24 hours. Thereafter, the unreacted monomer, unreacted terminal modifier and solvent were removed by purification and the polymerization product C-4 was taken out.

EXAMPLES 13 TO 16 AND COMPARATIVE EXAMPLES 11 TO 14

The monomer and halogen compound indicated in Table 1 or 2 were weighed into a 500 mL-volume separable flask and a four-neck separable cover, a stirring impeller, a three-way cock, a cooling tube and a temperature probe were attached to the flask, followed by bubbling for nitrogen purging. Then, under stirring at 100 rpm in a nitrogen gas stream at an internal temperature of 65° C., the polymerization by light irradiation was carried out using a high-pressure mercury vapor lamp (HLR100T-1, product of SEN Light) as the light source. The polymerization was stopped 5 hours after the start of reaction and 5 mL of the reaction mixture was sampled, weighed accurately, and concentrated to dryness at 120° C. After drying, the residue was weighed accurately and the degree of polymerization was calculated. After completion of polymerization, the terminal modifier and solvent B shown in Table 1 or 2 were added in the indicated amounts and the reaction was carried out at 120° C. for 24hours. Thereafter, the unreacted monomer, unreacted terminal modifier and solvent were removed by purification and the polymerization product, designated as D-1 to 4 and I-1 to 4, respectively, was taken out.

EXAMPLES 17 TO 19 AND 21 AND COMPARATIVE EXAMPLES 15 to 18

The monomer, halogen compound and metal compound indicated in Table 1 or 2 were weighed into a 500mL-volume separable flask and a four-neck separable cover, a stirring impeller, a three-way cock, a cooling tube and a temperature probe were attached to the flask, followed by bubbling for nitrogen purging. Then, under stirring at 100 rpm in a nitrogen gas stream at an internal temperature of 65° C., the polymerization by light irradiation was carried out using a high-pressure mercury vapor lamp (HLR100T-1, product of SEN Light)as the light source. The polymerization was stopped 5 hours after the start of reaction and 5 mL of the reaction mixture was sampled, weighed accurately, and concentrated to dryness at 120° C. After drying, the residue was weighed accurately and the degree of polymerization was calculated. After completion of polymerization, the terminal modifier and solvent B shown in Table 1 or 2 were added in the indicated amounts and the reaction was carried out at 120° C. for 24 hours. Thereafter, the unreacted monomer, unreacted terminal modifier and solvent were removed by purification and the polymerization product, designated as E-1 to 3, E-5 and J-1 to 4, respectively, was taken out.

EXAMPLE 20

2-Ethylhexyl acrylate, halogen compound and metal compound indicated in Table 1 were weighed into a 500 mL-volume separable flask and a four-neck separable cover, a stirring impeller, a three-way cock, a cooling tube and a temperature probe were attached to the flask, followed by bubbling for nitrogen purging. Then, under stirring at 100 rpm in a nitrogen gas stream at an internal temperature of 65° C., the polymerization by light irradiation was carried out using a high-pressure mercury vapor lamp (HLR100T-1, product of SEN Light) as the light source. At 5 hours after the start of reaction, methyl methacrylate bubbled through gas in advance was added as indicated in Table 1. The polymerization was stopped after 2 hours and 5 mL of the reaction mixture was sampled, weighed accurately, and concentrated to dryness at 120° C. After drying, the residue was weighed accurately and the degree of polymerization was calculated. After completion of polymerization, the terminal modifier shown in Table 1 was added in the indicated amount and the reaction was carried out at 120° C. for 24 hours. Thereafter, the unreacted monomer, unreacted terminal modifier and solvent were removed by purification and the polymerization product, designated as E-4, was taken out.

TABLE 1

| Example | Monomer 2EHA | BA | St | AN | MMA | Polymerization initiator AIBN | Solvent A Butyl acetate | Cyclo-hexanone | Halogen compound IMB | BCMB | BIMB | TIMB |
|---|---|---|---|---|---|---|---|---|---|---|---|---|
| 1 | 100 | — | — | — | — | — | — | — | 2.2 | — | — | — |
| 2 | 100 | — | — | — | — | — | — | — | — | — | 3.6 | — |
| 3 | — | 80 | 20 | — | — | — | — | — | — | — | — | 5.0 |
| 4 | 100 | — | — | — | — | 0.8 | 400 | — | 2.2 | — | — | — |
| 5 | 100 | — | — | — | — | 0.8 | 400 | — | — | — | 3.6 | — |
| 6 | 80 | — | — | — | 20 | 0.8 | 400 | — | — | — | 3.6 | — |
| 7 | — | 80 | 20 | — | — | 0.8 | 400 | — | — | — | — | 5.0 |
| 8 | 100 | — | — | — | — | — | — | — | 2.2 | — | — | — |
| 9 | 100 | — | — | — | — | — | — | — | — | — | 3.6 | — |
| 10 | — | 90 | — | 10 | — | — | — | 100 | — | 1.8 | — | — |
| 11 | 80 | — | — | — | 20 | — | 100 | — | — | — | 3.6 | — |
| 12 | — | 80 | 20 | — | — | — | 100 | — | — | — | — | 5.0 |
| 13 | 100 | — | — | — | — | — | — | — | 2.2 | — | — | — |
| 14 | 100 | — | — | — | — | — | — | — | — | — | 3.6 | — |
| 15 | — | 90 | — | 10 | — | — | — | — | — | 1.8 | — | — |
| 16 | — | 80 | 20 | — | — | — | — | — | — | — | — | 5.0 |
| 17 | 100 | — | — | — | — | — | — | — | 2.2 | — | — | — |
| 18 | 100 | — | — | — | — | — | — | — | — | — | 3.6 | — |
| 19 | — | 90 | — | 10 | — | — | — | 100 | — | 1.8 | — | — |
| 20 | 80 | — | — | — | 20 | — | 100 | — | — | — | 3.6 | — |
| 21 | — | 80 | 20 | — | — | — | 100 | — | — | — | — | 5.0 |

| Example | Halogen compound IFE | DTFA | DIFH | Iodoform | Metal compound T2EHA | BiOc | Solvent B Butyl acetate | Terminal modifier 2AE | APTES | AA | Polymer |
|---|---|---|---|---|---|---|---|---|---|---|---|
| 1 | — | — | — | — | — | — | 100 | 2.4 | — | — | A-1 |
| 2 | — | — | — | — | — | — | 100 | 2.4 | — | — | A-2 |
| 3 | — | — | — | — | — | — | 100 | 2.4 | — | — | A-3 |
| 4 | — | — | — | — | — | — | — | 2.4 | — | — | B-1 |
| 5 | — | — | — | — | — | — | — | 2.4 | — | — | B-2 |
| 6 | — | — | — | — | — | — | — | — | 8.9 | — | B-3 |
| 7 | — | — | — | — | — | — | — | 2.4 | — | — | B-4 |
| 8 | — | — | — | — | 0.4 | — | 100 | 2.4 | — | — | C-1 |
| 9 | — | — | — | — | 0.4 | — | 100 | 2.4 | — | — | C-2 |
| 10 | — | — | — | — | — | 0.6 | — | — | — | 2.3 | C-3 |
| 11 | — | — | — | — | — | 0.6 | — | — | 8.9 | — | C-4 |
| 12 | — | — | — | — | 0.4 | — | — | 2.4 | — | — | C-5 |
| 13 | — | — | — | — | — | — | 100 | 2.4 | — | — | D-1 |
| 14 | — | — | — | — | — | — | 100 | 2.4 | — | — | D-2 |
| 15 | — | — | — | — | — | — | 100 | — | — | 2.3 | D-3 |
| 16 | — | — | — | — | — | — | 100 | 2.4 | — | — | D-4 |
| 17 | — | — | — | — | 0.4 | — | 100 | 2.4 | — | — | E-1 |
| 18 | — | — | — | — | 0.4 | — | 100 | 2.4 | — | — | E-2 |
| 19 | — | — | — | — | — | 0.6 | — | — | — | 2.3 | E-3 |
| 20 | — | — | — | — | — | 0.6 | — | — | 8.9 | — | E-4 |
| 21 | — | — | — | — | 0.4 | — | — | 2.4 | — | — | E-5 |

TABLE 2

| Compar. Example | Monomer 2EHA | BA | St | AN | MMA | Polymerization initiator AIBN | Solvent A Butyl acetate | Cyclo-hexanone | Halogen compound IMB | BCMB | BIMB | TIMB |
|---|---|---|---|---|---|---|---|---|---|---|---|---|
| 1 | 100 | — | — | — | — | — | — | — | — | — | — | — |
| 2 | 100 | — | — | — | — | — | — | — | — | — | — | — |
| 3 | — | 80 | 20 | — | — | — | — | — | — | — | — | — |
| 4 | 100 | — | — | — | — | 0.8 | 400 | — | — | — | — | — |
| 5 | 100 | — | — | — | — | 0.8 | 400 | — | — | — | — | — |
| 6 | — | 80 | 20 | — | — | 0.8 | 400 | — | — | — | — | — |
| 7 | 100 | — | — | — | — | — | — | — | — | — | — | — |
| 8 | 100 | — | — | — | — | — | — | — | — | — | — | — |
| 9 | — | 90 | — | 10 | — | — | — | — | — | — | — | — |
| 10 | — | 80 | 20 | — | — | — | — | — | — | — | — | — |

TABLE 2-continued

| | | | | | | | | | | | | |
|---|---|---|---|---|---|---|---|---|---|---|---|---|
| 11 | 100 | — | — | — | — | — | — | — | — | — | — | — |
| 12 | 100 | — | — | — | — | — | — | — | — | — | — | — |
| 13 | — | 90 | — | 10 | — | — | — | — | — | — | — | — |
| 14 | — | 80 | 20 | — | — | — | — | — | — | — | — | — |
| 15 | 100 | — | — | — | — | — | — | — | — | — | — | — |
| 16 | 100 | — | — | — | — | — | — | — | — | — | — | — |
| 17 | — | 90 | — | 10 | — | — | — | — | — | — | — | — |
| 18 | — | 80 | 20 | — | — | — | — | — | — | — | — | — |

| | Halogen compound | | | | Metal compound | | Solvent B | Terminal modifier | | | |
|---|---|---|---|---|---|---|---|---|---|---|---|
| Example | IFE | DTFA | DIFH | Iodoform | T2EHA | BiOc | Butyl acetate | 2AE | APTES | AA | Polymer |
| 1 | 2.5 | — | — | — | — | — | 100 | 2.4 | — | — | F-1 |
| 2 | — | — | 5.5 | — | — | — | 100 | 2.4 | — | — | F-2 |
| 3 | — | — | — | 3.9 | — | — | 100 | 2.4 | — | — | F-3 |
| 4 | 2.5 | — | — | — | — | — | — | 2.4 | — | — | G-1 |
| 5 | — | — | 5.5 | — | — | — | — | 2.4 | — | — | G-2 |
| 6 | — | — | — | 3.9 | — | — | — | 2.4 | — | — | G-3 |
| 7 | 2.5 | — | — | — | 0.4 | — | 100 | 2.4 | — | — | H-1 |
| 8 | — | — | 5.5 | — | 0.4 | — | 100 | 2.4 | — | — | H-2 |
| 9 | — | 2.0 | — | — | — | — | 100 | — | — | 2.3 | H-3 |
| 10 | — | — | — | 3.9 | 0.4 | — | 100 | 2.4 | — | — | H-4 |
| 11 | 2.5 | — | — | — | — | — | 100 | 2.4 | — | — | I-1 |
| 12 | — | — | 5.5 | — | — | — | 100 | 2.4 | — | — | I-2 |
| 13 | — | 2.0 | — | — | — | — | 100 | — | — | 2.3 | I-3 |
| 14 | — | — | — | 3.9 | — | — | 100 | 2.4 | — | — | I-4 |
| 15 | 2.5 | — | — | — | — | — | 100 | 2.4 | — | — | J-1 |
| 16 | — | — | 5.5 | — | — | — | 100 | 2.4 | — | — | J-2 |
| 17 | — | 2.0 | — | — | — | — | 100 | — | — | 2.3 | J-3 |
| 18 | — | — | — | 3.9 | — | — | 100 | 2.4 | — | — | J-4 |

The values in Tables 1 and 2 represent parts by weight.

The monomers are indicated by the following abbreviations in Tables 1 and 2.
EHA: 2-Ethylhexyl acrylate
BA: Butyl acrylate
St: Styrene
AN: Acrylonitrile
MMA: Methyl methacrylate The halogen compounds are indicated by the following abbreviations in Tables 1 and 2.
IMB: Iodomethylbenzene
BCMB: 1,4-Bis(chloromethyl)benzene
BIMB: 1,4-Bis(iodomethyl)benzene
TIMB: 1,3,5-Tris(iodomethyl)benzene
IFE: Iodoperfluoroethane
DTFA: 1,3-Dichlorotetrafluoroacetone
DIFH: 1,6-Diiodoperfluorohexane The metal compounds are indicated by the following abbreviations in Tables 1 and 2.
T2EHA: Tin bis(2-ethylhexanoate)
BiOc: Bismuth trioctylate The terminal modifiers are indicated by the following abbreviations in Tables 1 and 2.
2AE: 2-Aminoethanol
APTES: 3-Aminopropyltriethoxysilane
AA: Allylamine

Determination of Number Average Molecular Weight and Molecular Weight Distribution The polymerization product obtained was subjected to gel permeation column chromatography (column: product of Showa Denko: KF-80M×2) using tetrahydrofuran as the eluent and the number average molecular weight, weight average molecular weight, and molecular weight distribution (MW/MN, the ratio between the weight average molecular weight, MW, and the number average molecular weight, MN) of the polymerization product were determined from the calibration curve constructed with polystyrene standards. The number average molecular weight and molecular weight distribution (MW/MN) thus obtained are shown in Tables 3 and 4.

Determination of Terminal Functional Group Introduction Rate

Depending on the kind of each terminal group, the following titrimetric procedure was carried out and the terminal functional group introduction rate was calculated. The terminal functional group introduction rate is expressed in percentage relative to the number of terminal groups ideally introduced by using the value found from the number of terminal functional groups obtained by the titrimetric procedure described below and the number average molecular weight obtained by gel permeation column chromatography. The terminal functional group introduction rates thus obtained are shown in Tables 3 and 4.

Assay of the Number of Terminal Hydroxyl Groups

The number of terminal hydroxyl groups in each of the polymerization products obtained in Examples 1 to 5, 7 to 9, 12 to 14, 16 to 18, and 21 and Comparative Examples 1 to 8, 10 to 12, 14 to 16, and 18 was calculated by esterifying with a solution of phthalic anhydride in pyridine and titrating the stoichiometric excess of the reagent with a solution of sodium hydroxide in accordance with JIS K 1557.

Assay of Terminal Vinyl Groups

The number of terminal vinyl groups in each of the polymerization products obtained in Examples 10, 15 and 19 and Comparative Examples 9, 13 and 17 was determined by $^1$H-NMR in deuteriochloroform and calculated.

Assay of Terminal Ethoxysilyl Groups

The number of terminal ethoxysilyl groups in each of the polymerization products obtained in Examples 6, 11 and 20 was determined by $^1$H-NMR in deuteriochloroform and calculated.

TABLE 3

| Example | Polymer | Polymerization period (hrs) | Number average molecular weight | Molecular weight distribution (MW/MN) | Degree of polymerization (%) | Terminal functional group introduction rate (%) |
|---|---|---|---|---|---|---|
| 1 | A-1 | 16 | 5000 | 1.31 | 48 | 98 |
| 2 | A-2 | 16 | 5400 | 1.25 | 52 | 96 |
| 3 | A-3 | 16 | 5300 | 1.32 | 52 | 96 |
| 4 | B-1 | 6 | 11500 | 1.64 | 83 | 92 |
| 5 | B-2 | 6 | 11000 | 1.65 | 94 | 91 |
| 6 | B-3 | 8 | 10800 | 1.65 | 92 | 91 |
| 7 | B-4 | 6 | 12100 | 1.69 | 95 | 90 |
| 8 | C-1 | 8 | 8800 | 1.44 | 85 | 96 |
| 9 | C-2 | 8 | 9200 | 1.45 | 90 | 97 |
| 10 | C-3 | 8 | 9400 | 1.47 | 87 | 94 |
| 11 | C-4 | 12 | 10100 | 1.45 | 91 | 95 |
| 12 | C-5 | 8 | 8300 | 1.47 | 92 | 94 |
| 13 | D-1 | 5 | 5200 | 1.31 | 50 | 94 |
| 14 | D-2 | 5 | 4800 | 1.27 | 55 | 97 |
| 15 | D-3 | 5 | 5100 | 1.26 | 52 | 97 |
| 16 | D-4 | 5 | 4900 | 1.29 | 57 | 95 |
| 17 | E-1 | 5 | 10400 | 1.45 | 95 | 96 |
| 18 | E-2 | 5 | 11000 | 1.46 | 96 | 96 |
| 19 | E-3 | 5 | 10500 | 1.45 | 98 | 97 |
| 20 | E-4 | 7 | 9900 | 1.43 | 95 | 95 |
| 21 | E-5 | 5 | 10100 | 1.47 | 98 | 94 |

TABLE 4

| Compar. Example | Polymer | Polymerization period (hrs) | Number average molecular weight | Molecular weight distribution (MW/MN) | Degree of polymerization (%) | Terminal functional group introduction rate (%) |
|---|---|---|---|---|---|---|
| 1 | F-1 | 16 | — | — | Trace | — |
| 2 | F-2 | 16 | — | — | Trace | — |
| 3 | F-3 | 16 | — | — | Trace | — |
| 4 | G-1 | 6 | 19300 | 2.31 | 88 | 68 |
| 5 | G-2 | 6 | 18000 | 2.20 | 91 | 70 |
| 6 | G-3 | 6 | 9600 | 2.23 | 92 | 71 |
| 7 | H-1 | 8 | 2500 | 1.45 | 15 | 89 |
| 8 | H-2 | 8 | 4800 | 1.32 | 17 | 81 |
| 9 | H-3 | 8 | 8200 | 2.30 | 10 | 67 |
| 10 | H-4 | 8 | 5300 | 1.38 | 24 | 72 |
| 11 | I-1 | 5 | 2900 | 1.19 | 4 | — |
| 12 | I-2 | 5 | 3100 | 1.18 | 3 | — |
| 13 | I-3 | 5 | 4800 | 2.14 | 2 | — |
| 14 | I-4 | 5 | 3200 | 1.20 | 3 | — |
| 15 | J-1 | 5 | 12500 | 1.35 | 39 | 74 |
| 16 | J-2 | 5 | 14000 | 1.38 | 48 | 68 |
| 17 | J-3 | 5 | 25300 | 2.23 | 30 | 57 |
| 18 | J-4 | 5 | 13200 | 1.82 | 45 | 70 |

INDUSTRIAL APPLICABILITY

In the production method of a functional group-terminated vinyl polymer in accordance with the first and the second aspect of the invention, a radical polymerization is carried out in the presence of a halogen compound having the structure defined hereinabove so that a halogen atom-terminated polymer can be synthesized with certainty. Further, as the terminal halogen atom is then transformed, the reaction proceeds living-wise with low chances for side reactions so that a functional group can be easily introduced into the terminus to produce the objective polymer practically without reaction condition problems such as strictly anhydrous conditions.

Furthermore, using a 14 to 16 metal compound in the step of said radical polymerization leads to a curtailed reaction period and a higher degree of polymerization of the vinyl polymer.

In addition, the functional group-terminated vinyl polymer according to the third aspect of the invention has a number average molecular weight within a defined range and the chain extension by terminal-terminal crosslinking takes place with good efficiency so that a high molecular weight polymer having a linearly elongated chain can be produced and, therefore, a cured product with good elongation and tensile strength, outstanding heat resistance, water resistance and durability can be obtained.

Therefore, the functional group-terminated vinyl polymer according to the third aspect of the invention is useful as a raw material for the production of various functional products.

What is claimed is:
1. A production method of a functional group-terminated vinyl polymer comprising
   a step of synthesizing a halogen atom-terminated vinyl polymer by the radical polymerization reaction of a vinyl monomer in the presence of a halogen compound and
   a step of introducing a functional group to a terminus by substituting a functional group-containing group for the terminal halogen atom of said vinyl polymer, said halogen compound having a structure such that said halogen atom is bound to a carbon atom linked to an aromatic ring and said radical polymerization reaction being carried out either by light irradiation or light irradiation in the presence of a Group 14 to 16 metal compound or by heating in the presence of a Group 14 to 16 metal compound.

2. A production method of a functional group-terminated vinyl polymer comprising a step of synthesizing an iodine atom-terminated vinyl polymer by the radical polymerization reaction of a vinyl monomer in the presence of an iodine compound and a step of introducing a functional group to the terminus by substituting a functional group-containing group for the terminal iodine atom of said vinyl polymer, said iodine compound having a structure such that said iodine atom is bound to a carbon atom linked to an aromatic ring and said radical polymerization reaction being carried out either by heating or by heating in the presence of a radical polymerization initiator.

3. The production method of a functional group-terminated vinyl polymer according to claim 2, wherein the iodine compound has two or more iodine atoms.

4. The production method of a functional group-terminated vinyl polymer according to claim 2, wherein the functional group to be introduced into a terminus is one or more fustian groups selected from the group consisting of hydroxyl, amino, carboxyl, vinyl and silyl groups.

5. A production method of a functional group-terminated vinyl polymer comprising a step of synthesizing a halogen atom-terminated vinyl polymer by the radical polymerization reaction of vinyl monomer in the presence of a halogen compound and a step of introducing a functional group to a terminus by substituting a functional group-containing group for the terminal halogen atom of said vinyl polymer, said halogen compound having a structure such that said halogen atom is bound to a carbon atom linked to an aromatic ring and said radical polymerization reaction being carried out either by light irradiation in the presence of a tin compound or a bismuth compound or by heating in the presence of a tin compound or a bismuth compound.

6. The production method of a functional group-terminated vinyl polymer according to claim 1, wherein the halogen compound has two or more halogen atoms.

7. The production method of a functional group-terminated vinyl polymer according to claim 1, wherein the functional group to be introduced into a terminus is one or more functional groups selected from the group consisting of hydroxyl, amino, carboxyl, vinyl and silyl groups.

8. The production method of a functional group-terminated vinyl polymer according to claim 3, wherein the functional group to be introduced into a terminus is one or more functional groups selected from the group consisting of hydroxy, amino, carboxyl, vinyl and silyl groups.

9. The production method of a functional group-terminated vinyl polymer according to claim 5, wherein the halogen compound has two or more halogen atoms.

10. The production method of a functional group-terminated vinyl polymer according to claim 5, wherein the functional group to be introduced into a terminus is one or more functional groups selected from the group consisting of hydroxyl, amino, carboxyl, vinyl and silyl groups.

11. The production method of a functional group-terminated vinyl polymer according to claim 6, wherein the functional group to be introduced into a terminus is one or more functional groups selected from the group consisting of hydroxyl, amino, carboxyl, vinyl and silyl groups.

* * * * *

UNITED STATES PATENT AND TRADEMARK OFFICE
CERTIFICATE OF CORRECTION

| | |
|---|---|
| PATENT NO. | : 6,693,142 B1 |
| APPLICATION NO. | : 10/019055 |
| DATED | : February 17, 2004 |
| INVENTOR(S) | : Wakiya et al. |

Page 1 of 1

It is certified that error appears in the above-identified patent and that said Letters Patent is hereby corrected as shown below:

Col. 19, line 32, "fustian" should read --"functional"--.

Col. 20, line 23, "hydroxy" should read --"hydroxyl"--.

Signed and Sealed this

Twenty-second Day of August, 2006

JON W. DUDAS
*Director of the United States Patent and Trademark Office*